United States Patent [19]
Mizutani et al.

[11] Patent Number: 5,698,780
[45] Date of Patent: Dec. 16, 1997

[54] METHOD AND APPARATUS FOR DETECTING A MALFUNCTION IN AN INTAKE PRESSURE SENSOR OF AN ENGINE

[75] Inventors: Koichi Mizutani; Keisuke Ikari, both of Toyota, Japan

[73] Assignee: Toyota Jidosha Kabushiki Kaisha, Aichi-Ken, Japan

[21] Appl. No.: 710,504

[22] Filed: Sep. 18, 1996

[30] Foreign Application Priority Data

Dec. 6, 1995 [JP] Japan ................... 7-318357

[51] Int. Cl.⁶ .................. G01M 19/00; G01P 5/00
[52] U.S. Cl. .................................. 73/118.2
[58] Field of Search ................... 73/115, 118.2, 73/753, 4 R, 714; 364/431.03, 431.04, 431.05; 123/412, 422, 463, 478, 494

[56] References Cited

U.S. PATENT DOCUMENTS

| | | | |
|---|---|---|---|
| 4,807,581 | 2/1989 | Nishikawa et al. | 73/118.2 |
| 4,926,335 | 5/1990 | Flowers et al. | 364/431.05 |
| 5,003,950 | 4/1991 | Kato et al. | 123/422 |
| 5,029,569 | 7/1991 | Cullen et al. | 123/494 |
| 5,136,517 | 8/1992 | Cullen et al. | 364/431.05 |
| 5,546,795 | 8/1996 | Yamagishi | 73/118.2 |

FOREIGN PATENT DOCUMENTS

63-200648 12/1988 Japan.
1-92551 4/1989 Japan.

*Primary Examiner*—Richard Chilcot
*Assistant Examiner*—William L. Oen
*Attorney, Agent, or Firm*—Kenyon & Kenyon

[57] ABSTRACT

An apparatus for detecting a malfunction in an intake pressure sensor of an engine includes a first detecting unit which detects a flow rate of intake air of the engine. A second detecting unit detects an engine speed of the engine. An intake pressure estimating unit determines an intake-air specific flow rate from the intake-air flow rate and the engine speed and determines characteristic values for the intake-air specific flow rate, the characteristic values being representative of an allowable range of intake pressure of the engine for the intake-air specific flow rate. A malfunction determining unit detects whether a malfunction in the intake pressure sensor has occurred, by comparing a signal output by the intake pressure sensor with the characteristic values determined by the intake pressure estimating unit.

14 Claims, 5 Drawing Sheets

METHOD AND APPARATUS FOR DETECTING A MALFUNCTION IN AN INTAKE PRESSURE SENSOR OF AN ENGINE

BACKGROUND OF THE INVENTION

(1) Field of the Invention

The present invention generally relates to an intake pressure sensor malfunction detecting apparatus and method, and more particularly to an apparatus and method for detecting a malfunction in an intake pressure sensor of an engine in which an air flow rate detecting unit and an engine speed detecting unit are provided.

(2) Description of the Related Art

It is known that, in order to control an internal combustion engine of an automotive vehicle, various engine control procedures are performed based on a measured value of intake pressure indicated by a signal output by an intake pressure sensor. The engine control procedures include a fuel injection control procedure, an exhaust gas recirculation (EGR) control procedure, and an evaporative emission control procedure.

The intake pressure sensor outputs a signal indicating a value of intake pressure of the engine. If the signal output by the intake pressure sensor contains a significant error, the engine control procedures based on the intake pressure value do not provide an appropriate control over the engine operations.

In particular, when the signal output by the intake pressure sensor indicates an unsuitable value, an improper EGR control value is determined at a result of the performance of the EGR control procedure based on the intake pressure signal. Hereinafter, such a signal of the intake pressure sensor is called an out-of-range signal. When the improper EGR control value is used in the exhaust emission control operation of the engine, the exhaust emission control operation has a difficulty maintaining the driveability of the vehicle at an appropriate level.

In order to provide an appropriate control over the engine operations, it is necessary to detect whether the signal output by the intake pressure sensor indicates a correct intake pressure value, or whether the intake pressure sensor is normally operating without malfunction, before performing the engine control procedures.

Japanese Laid-Open Utility Model Application No. 63-200648 teaches that a correlation between intake-air specific flow rate and intake pressure is recognized. The intake-air specific flow rate indicates a mass flow rate of intake air per one revolution of the engine. The intake-air specific flow rate is calculated by dividing a measured intake-air mass flow rate by a measured engine speed.

Supposing that the correlation between the intake-air specific flow rate and the intake pressure is recognized, by storing a map defining the correlation between intake-air specific flow rate and intake pressure, it is possible to easily estimate a characteristic value representative of the intake pressure for the intake-air specific flow rate based on the stored map.

However, it is not known that the estimated value of the intake pressure is used to detect whether a malfunction in the intake pressure sensor has occurred. The above publication does not teach the use of the correlation between intake-air specific flow rate and intake pressure for the estimation of the intake pressure and how to detect a malfunction in the intake pressure sensor by using the estimated intake pressure value.

Japanese Laid-Open Patent Application No. 1-92551 teaches a method of detecting whether a malfunction in an intake pressure sensor has occurred. The detection of the above publication is performed based on only the signal output by the intake pressure sensor.

The above publication does not teach the use of the correlation between intake-air specific flow rate and intake pressure for the estimation of the intake pressure and how to detect a malfunction in the intake pressure sensor by using the estimated intake pressure value.

It is desirable to provide a malfunction detecting apparatus for an intake pressure sensor in which a characteristic value representative of the intake pressure for the intake-air specific flow rate is estimated based on the map defining the correlation between intake-air specific flow rate and intake pressure, and the malfunction determination of the intake pressure sensor is carried out by using the estimated value of the intake pressure. By using the above malfunction detecting apparatus in the engine control procedures, it is possible to always provide an appropriate control over the engine operations regardless of whether the intake pressure sensor is normally operating or malfunctions.

SUMMARY OF THE INVENTION

An object of the present invention is to provide a novel and useful intake pressure sensor malfunction detecting apparatus in which the above-described problems are eliminated.

Another object of the present invention is to provide an intake pressure sensor malfunction detecting apparatus which accurately detects a malfunction in the intake pressure sensor with a remarkably simple structure.

A further object of the present invention is to provide an intake pressure sensor malfunction detecting apparatus and method which allows an engine control system to provide appropriate control over the engine operations regardless of whether the intake pressure sensor is normally operating or malfunctions.

The above-mentioned objects of the present invention are achieved by an apparatus for detecting a malfunction in an intake pressure sensor of an engine, which includes: a first detecting unit which detects a flow rate of intake air of the engine; a second detecting unit which detects an engine speed of the engine; an intake pressure estimating unit which determines an intake-air specific flow rate from the intake-air flow rate and the engine speed, and determines characteristic values for the intake-air specific flow rate, the characteristic values being representative of an allowable range of intake pressure of the engine for the intake-air specific flow rate; and a malfunction determining unit which detects whether a malfunction in the intake pressure sensor has occurred, by comparing a signal output by the intake pressure sensor with the characteristic values determined by the intake pressure estimating unit.

The above-mentioned objects of the present invention are achieved by a method of detecting a malfunction in an intake pressure sensor of an engine, which comprises the steps of: detecting a specific flow rate of intake air of the engine; detecting an engine speed of the engine; generating characteristic values from the intake-air specific flow rate and the engine speed, the characteristic values being representative of intake pressure of the engine for the intake-air specific flow rate; and detecting whether a malfunction in the intake pressure sensor has occurred, by comparing a signal output by the intake pressure sensor with the characteristic values.

It is possible for the malfunction detecting apparatus and method of the present invention to detect, with a reasonable level of accuracy, a malfunction in an intake pressure sensor of an engine having an intake-air flow rate sensing unit and an engine speed sensing unit. In addition, by using the malfunction detecting apparatus of the present invention, it is possible to reliably prevent the emission performance of the engine from being lowered due to the out-of-range signal from the intake pressure sensor. Further, it is possible for the malfunction detecting apparatus and method of the present invention to provide an accurate malfunction determination of the intake pressure sensor to the engine control system with a remarkably low cost so that an appropriate control over the engine control procedures is provided.

BRIEF DESCRIPTION OF THE DRAWINGS

Other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
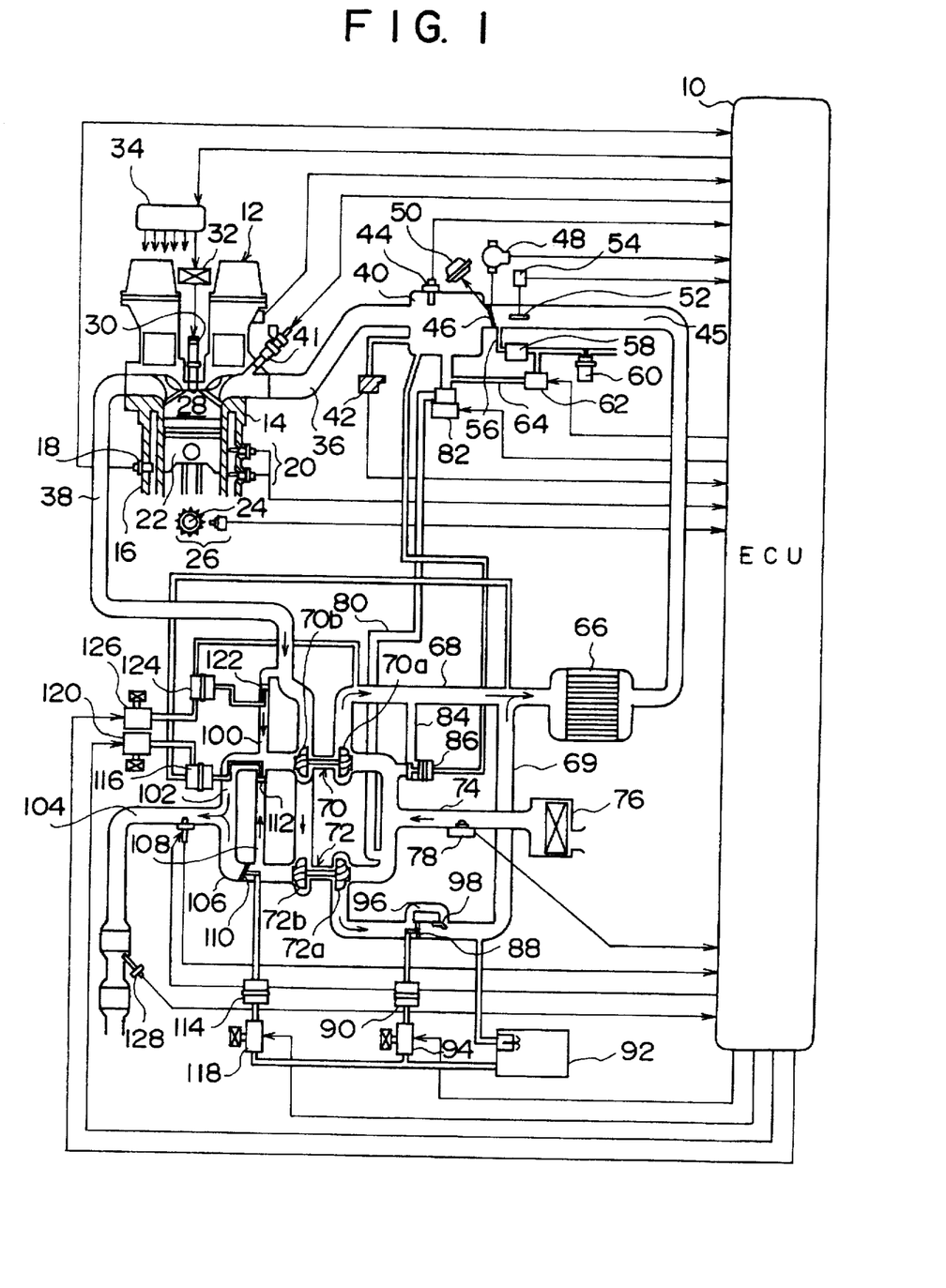
FIG. 1 is a system block diagram of an engine control system to which the present invention is applied.

FIG. 1 shows an engine control system to which the present invention is applied.

In the engine control system, as shown in FIG. 1, an internal combustion engine 12 is controlled by an electronic control unit (ECU) 10. To achieve an apparatus for detecting a malfunction in an intake pressure sensor according to the present invention, the ECU 10 performs a malfunction detection routine which will be described later.

Referring to FIG. 1, the engine 12 includes a cylinder block 14 in which a plurality of pistons 22 in a corresponding number of cylinders are included. The pistons 22 are water-tightly and movably provided within the cylinder block 14. For the sake of convenience, only a single piston 22 in one of the cylinders of the cylinder block 14 is shown in FIG. 1.

The cylinder block 14 includes a water jacket 16. A water temperature sensor 18 and a knock sensor 20 are attached to the water jacket 16. The water temperature sensor 18 senses a temperature of cooling water circulated in the water jacket 16 and outputs a signal indicating the cooling water temperature to the ECU 10. The knock sensor 20 senses a vibration of the cylinder block 14 and outputs a signal indicating the vibration to the ECU 10.

A crankshaft 24 is connected to the pistons 22. A crank position sensor 26 is attached to the crankshaft 24. The crank position sensor 26 outputs a pulsed signal in response to the rotating angle of the crankshaft 24. The ECU 10 calculates an engine speed (NE) in accordance with the period of the pulsed signal output by the crank position sensor 26.

In the engine 12, a combustion chamber 28 above the piston 22 is formed within the cylinder block 14. A spark plug 30 is attached to the cylinder block 14, and the leading edge of the spark plug 30 projects into the combustion chamber 28. An ignition coil 32 is electrically connected to the spark plug 30. An igniter 34 is connected to the ignition coil 32, and an output of the ECU 10 is connected to the igniter 34.

The igniter 34 turns ON and OFF the primary current supplied to the ignition coil 32 in synchronism with the time the ECU 10 outputs an ignition signal to the igniter 34. When the primary current to the ignition coil 32 is turned ON or OFF, a high-voltage ignition current is generated on the secondary side of the ignition coil 32 so that it is supplied to the spark plug 30. The high-voltage ignition current is generated in synchronism with the time the ECU 10 outputs the ignition signal to the igniter 34.

An intake manifold 36 and an exhaust manifold 38 are connected to the cylinder block 14. As shown in FIG. 1, in the combustion chamber 28 of each cylinder of the cylinder block 14, an intake valve is provided at an outlet of the intake manifold 36, and an exhaust valve is provided at an inlet of the exhaust manifold 38.

In the intake manifold 36, a plurality of branch lines and a surge tank 40 are provided. The branch lines of the intake manifold 36 are respectively connected to the cylinders of the engine 12. The surge tank 40 and the cylinders of the engine 12 communicate with each other via the branch lines of the intake manifold 36. An electromagnetic-valve-type injector 41 is provided in each of the branch lines of the intake manifold 36. In the engine control system, the amount of fuel injected to the engine 12 is controlled by varying the duration of a drive signal supplied from the ECU 10 to the injector 41.

A turbo pressure sensor 42 and an intake air temperature sensor 44 are attached to the surge tank 40. The turbo pressure sensor 42 outputs a signal indicating a value of the internal pressure of the surge tank 40, to the ECU 10. The intake air temperature sensor 44 outputs a signal indicating the temperature of air flowing in the surge tank 40, to the ECU 10. In the above-mentioned engine control system, the turbo pressure sensor 42 is the intake pressure sensor which outputs a signal indicating a value of intake manifold pressure (PM) of the engine 12.

The ECU 10 detects a value of intake manifold pressure (PM) in accordance with the signal output by the turbo pressure sensor 42. The ECU 10 detects a value of intake air temperature (THA) in accordance with the signal output by the intake air temperature sensor 44. In the following description, a measured value of intake manifold pressure (PM) of the engine 12 indicated by the signal output by the turbo pressure sensor 42 is designated by "Vpim".

An intake pipe 45 is connected to the surge tank 40 on its upstream side. In the intake pipe 45, a throttle valve 46 is provided. The throttle valve 46 is operated in response to the position of an accelerator pedal (not shown) which is set by a vehicle operator. An opening angle of the throttle valve 46 is controlled in accordance with the position of the accelerator pedal. A throttle position sensor 48 is provided in the vicinity of the throttle valve 46, and outputs a signal indicating the opening angle of the throttle valve 46 to the ECU 10.

In addition, a dash pot 50 is connected to the throttle valve 46. The dash pot 50 prevents the throttle valve 46 from being rapidly closed to its fully closed position during a deceleration of the vehicle. A sub-throttle valve 52 is provided in the intake pipe 45 at an upstream position of the throttle valve 46. An opening angle of the sub-throttle valve 52 is controlled by the ECU 10. A throttle position sensor 54 is provided in the vicinity of the sub-throttle valve 52, and outputs a signal indicating the opening angle of the sub-throttle valve 52.

A vapor passage 56 has an inlet connected to the intake pipe 45 at a position between the throttle valve 46 and the sub-throttle valve 52. A canister 60 is connected to an outlet of the vapor passage 56. The canister 60 has a vapor port connected to the vapor passage 56 so that the canister 60 and the vapor passage 56 communicate with each other. The canister 60 is connected to an outlet pipe leading to the atmosphere.

In the vapor passage 56, a check valve 58 is provided. The check valve 58 permits the flow of evaporated fuel in the vapor passage 56 in the direction from the intake pipe 45 to the canister and inhibits the counterflow of the evaporated fuel therein in the opposite direction.

When the engine 12 stops operating, evaporated fuel from the engine 12 may enter the intake pipe 45. The evaporated fuel from the intake pipe 45 is sent to the canister 60 through the vapor passage 56, and it is stored in the canister 60. As described above, the counterflow of the evaporated fuel from the canister 60 to the intake pipe 45 through the vapor passage 56 is prevented by the check valve 58.

A purge passage 64 is connected at one end to the vapor passage 56 and connected at the other end to the surge tank 40. In the purge passage 64, a vacuum switching valve (VSV) 62 is provided. The purge passage 64 and the surge tank 40 communicate with each other. The canister 60 in the vapor passage 56 is connected to the surge tank 40 through the purge passage 64 via the VSV 62.

When the engine 12 is operating, the internal space of the purge passage 64 is subjected to negative pressure. To control switching ON and OFF the VSV 62 in the purge passage 64, an evaporative emission control procedure is performed by the ECU 10 in accordance with an operating condition of the engine 12. Switching ON the VSV 62 to make the purge passage 64 opened to the surge tank 40 is controlled by the ECU 10, and the evaporated fuel stored in the canister 60 is purged into the surge tank 40 during the operation of the engine 12.

The intake pipe 45 is connected to an inter-cooler 66. The inter-cooler 66 is connected to both a first pressure-charging passage 68 and a second pressure-charging passage 69. A first turbo charger 70 is provided in the first pressure-charging passage 68. A compressor 70a of the first turbo charger 70 is provided at a discharging port of the first turbo charger 70, and this discharging port communicates with the first pressure-charging passage 68. In addition, a second turbo charger 72 is provided in the second pressure-charging passage 69. A compressor 72a of the second turbo charger 72 is provided at a discharging port of the second turbo charger 72, and this discharging port communicates with the second pressure-charging passage 69.

Further, both an intake port of the first turbo charger 70 and an intake port of the second turbo charger 72 communicate with an air intake pipe 74. An air filter 76 is provided at the end of the air intake pipe 74. The air filter 76 communicates with the intake ports of the first and second turbo chargers 70 and 72 through the air intake pipe 74.

In the air intake pipe 74, an air flow meter 78 is provided. The air flow meter 78 outputs a signal indicating a mass flow rate of intake air in the air intake pipe 74, to the ECU 10. The ECU 10 detects an intake-air flow rate (G) of the engine 12 in accordance with the signal output by the air flow meter 78. In the above-mentioned engine control system, the air flow meter 78 is the air flow rate sensing unit which outputs a signal indicating a flow rate of intake air of the engine 12. In the following description, the signal output by the air flow meter 78 will be referred to as a signal "G". The signal G indicates the intake-air flow rate of the engine 12.

A by-pass passage 80 has an inlet connected to the air intake pipe 74 and an outlet connected to the surge tank 40. The by-pass passage 80 connects the air intake pipe 74 wherein the first and second turbo chargers 70 and 72 are provided, to the throttle valve 46 in the intake pipe 45.

An idle speed control valve (ISCV) 82 is provided at an intermediate portion of the by-pass passage 80. An opening angle of the ISCV 82 in the by-pass passage 80 is controlled in accordance with a signal output by the ECU 10. The controlled opening angle of the ISCV 82 sets the flow rate of the intake air of the engine 12 so that an idle speed of the engine 12 is controlled to an appropriate engine speed. The idle speed is an engine speed when the opening angle of the throttle valve 46 in the intake pipe 45 is set at its fully-closed position.

An intake by-pass passage 84 has an inlet connected to the first pressure-charging passage 68 and an outlet connected to the air intake pipe 74. A by-pass control valve 86 is provided in the intake by-pass passage 84, and the by-pass control valve 86 is opened or closed in response to negative pressure in the surge tank 40. The by-pass control valve 86 is operated such that the intake by-pass passage 84 is closed by the by-pass control valve 86 when the throttle valve 46 in the intake pipe 45 is opened, and the intake by-pass passage 84 is opened thereby when the throttle valve 46 is set at the fully-closed position.

When the throttle valve 46 is opened in the intake pipe 45, the first turbo charger 70 sends compressed air to the first pressure-charging passage 68. If the flow of the compressed air in the first pressure-charging passage 68 is shut off by setting the throttle valve 46 at the fully-closed position under the above condition, a surging noise may be made at the first turbo charger 70.

In the above engine control system, the by-pass control valve 86 is operated to make the intake by-pass passage 84 opened to the air intake pipe 74 immediately after the throttle valve 46 is set at the fully-closed position under the above condition. Since the compressed air from the first pressure-charging passage 68 is fed back to the air intake pipe 75 via the by-pass control valve 86, it is possible for the above engine control system to prevent the surging noise at the first turbo charger 70 from being made.

In the second pressure-charging passage 69, an intake control valve 88 is provided. A negative-pressure actuator 90 is connected to the intake control valve 88. The negative-pressure actuator 90 communicates with a negative-pressure tank 92 via a vacuum switching valve (VSV) 94. Switching ON and OFF the VSV 94 is controlled in accordance with a signal output by the ECU 10 so that the negative pressure actuator 90 is subjected to negative pressure in the negative pressure tank 92 or to the atmospheric pressure. The intake control valve 88 in the second pressure-charging passage 69 is opened or closed by the negative pressure actuator 90 in accordance with the ON/OFF state of the VSV 94.

A by-pass passage 96 has an inlet and an outlet both connected to the second pressure-charging passage 69. The inlet of the by-pass passage 96 is provided in the vicinity of the intake control valve 88. A reed valve 98 is provided in the second pressure-charging passage 69 in the vicinity of the outlet of the by-pass passage 96. The reed valve 98 is a kind of a check valve, and it is operated to open the outlet of the by-pass passage 96 when the internal pressure of the second pressure-charging passage 69 exceeds a predetermined valve-opening pressure.

In the above engine control system, there is a case in which the second turbo charger 72 is operated when the second pressure-charging passage 69 is closed by the intake control valve 88. When the internal pressure of the second pressure-charging passage 69 exceeds the valve-opening pressure in such a case, the reed valve 98 is operated to open the outlet of the by-pass passage 96. It is possible for the above engine control system to prevent the internal pressure of the second pressure-charging passage 69 from being excessively increased in the above case.

A turbine 70b of the first turbo charger 70 is provided at a suction port of the first turbo charger 70 in the exhaust manifold 38, and this suction port communicates with a first exhaust passage 102. In addition, a turbine 72b of the second turbo charger 72 is provided at a suction port of the second turbo charger 72 in the exhaust manifold 38, and this suction port communicates with a second exhaust passage 106. A waist gate passage 100 has an inlet connected to the exhaust manifold 38 and an outlet connected to the first exhaust passage 102, and the exhaust manifold 38 communicates with the first exhaust passage 102 through the waist gate passage 100.

An exhaust pipe 104 is connected to both the first exhaust passage 102 and the second exhaust passage 106 so that the exhaust pipe 104 communicates with both the suction port of the first turbo charger 70 and the suction port of the second turbo charger 72. An exhaust by-pass passage 108 has an inlet connected to the second exhaust passage 106 and an outlet connected to the first exhaust passage 102, and the first exhaust passage 102 communicates with the second exhaust passage 106 through the exhaust by-passage 108.

An exhaust control valve 110 is provided in the second exhaust passage 106, and an exhaust by-pass valve 112 is provided in the exhaust by-pass passage 108. A negative-pressure actuator 114 is connected to the exhaust control valve 110, and a negative-pressure actuator 116 is connected to the exhaust by-pass valve 112. The negative-pressure tank 92 is connected to the negative-pressure actuator 114 via a vacuum switching valve (VSV) 118, and a vacuum switching valve (VSV) 120 is connected to the negative-pressure actuator 116. Switching ON and OFF the VSV 118 is controlled in accordance with a signal output by the ECU 10 so that the second exhaust passage 106 is opened or closed by the exhaust control valve 110. Further, switching ON and OFF the VSV 120 is controlled in accordance with a signal output by the ECU 10, so that the exhaust by-pass passage 108 is opened or closed by the exhaust by-pass valve 112.

When both the second exhaust passage 106 and the exhaust by-pass passage 108 are closed by the exhaust control valve 110 and the exhaust by-pass valve 112, the turbine 72b of the second turbo charger 72 is shut off from the exhaust pipe 104. In this case, the exhaust gas from the engine 12 does not flow into the turbine 72b, and the second turbo charger 72 is not operated.

When the second exhaust passage 106 remains closed by the exhaust control valve 110 and only the exhaust by-pass passage 108 is opened by the exhaust by-pass valve 112, the turbine 72b of the second turbo charger 72 partially communicates with the exhaust pipe 104. Only the first turbo charger 70 is operated by the exhaust gas from the engine 12. In this case, a small amount of the exhaust gas from the engine 12 flows into the turbine 72b, and the second turbo charger 72 is set in a waiting condition prior to the start of the operation.

When both the second exhaust passage 106 and the exhaust by-pass passage 108 are opened by the exhaust control valve 110 and the exhaust by-pass valve 112, the turbine 72b of the second turbo charger 72 communicates with the exhaust pipe 104 via the second exhaust passage 106. In this case, the exhaust gas from the engine 12 flows into the turbine 72a and the turbine 72b, and both the first turbo charger 70 and the second turbo charger 72 are operated.

A waist gate valve 122 is provided in the waste gate passage 100. A negative-pressure actuator 124 is connected to the waist gate valve 122. A vacuum switching valve (VSV) 126 is connected to the negative-pressure actuator 124. Switching ON and OFF the VSV 126 is controlled in accordance with a signal output by the ECU 10, so that the waist gate passage 100 is opened or closed by the waist gate valve 122.

When the waist gate passage 100 is closed by the waist gate valve 122, all the exhaust gas from the exhaust manifold 38 flows into the turbine 70b and the turbine 72b. In this case, the first turbo charger 70 and the second turbo charger 72 are operated to efficiently send the compressed air to intake pipe 45. On the other hand, when the waist gate passage 100 is opened by the waist gate valve 122, the exhaust gas from the exhaust manifold 38 does not flow to the turbines 70b and 72b but flows into the exhaust pipe 104 through the waist gate passage 100. The operation of each of the first turbo charger 70 and the second turbo charger 72 is stopped, and a further increase of the boost pressure is avoided.

An oxygen sensor 128 is provided in the exhaust pipe 104. The oxygen sensor 128 outputs a signal indicating the concentration of oxygen in the exhaust gas flowing through the exhaust pipe 104, to the ECU 10. The ECU 10 detects an air-fuel ratio of the air-fuel mixture supplied to the engine 12 in accordance with the signal output by the oxygen sensor 128. The ECU 10 performs a feedback procedure of the fuel injection control in which a target air-fuel ratio is determined and the amount of fuel injected to the engine 12 is controlled so that the detected air-fuel ratio follows the target air-fuel ratio.

In the above engine control system, when the engine 12 is operated in low-speed, light-load operating conditions, only the first turbo charger 70 is operated and the second turbo charger 72 is not operated. When the engine 12 is operated in high-speed, heavy-load operating conditions, both the first turbo charger 70 and the second turbo charger 72 are operated. In addition, when the boost pressure exceeds a reference pressure valve, the operation of each of the first turbo charger 70 and the second turbo charger 72 is stopped in order to avoid a further increase of the boost pressure.

The above-described functions of the engine control system are achieved by the ECU 10 through the controlling operations of the intake control valve 88, the exhaust control valve 110, the exhaust by-pass valve 112 and the waist gate valve 124 in accordance with the engine speed (NE) and the intake manifold pressure (PM), as follows. The engine speed NE is detected by the ECU 10 in accordance with the signal output by the crank position sensor 26, and the intake manifold pressure PM is detected by the ECU 10 in accordance with the signal output by the turbo pressure sensor 42.

When it is detected from the engine speed NE and the intake manifold pressure PM that the engine 12 is operated in the low-speed, light-load operating conditions and that the boost pressure is below the reference pressure value, the ECU 10 controls the above valves so that all the intake control valve 88, the exhaust control valve 110, the exhaust by-pass valve 112 and the waist gate valve 124 are turned OFF. Under the controlled conditions of the above valves, only the first turbo charger 70 is operated to send the compressed air to the intake pipe 45.

When it is detected that the operating conditions of the engine 12 are transitional to the high-speed, heavy-load operating conditions, the ECU 10 controls the above valves so that only the exhaust by-pass valve 112 is turned ON and the second turbo charger 72 is set in the waiting condition.

When it is detected that the engine 12 is operated in the high-speed, heavy-load operating conditions, the ECU 10 controls the above valves so that the exhaust control valve 110 is first turned ON and the intake control valve 88 is subsequently turned ON. Consequently, both the first turbo charger 70 and the second turbo charger 72 are operated.

The pressure charging abilities of the first turbo charger 70 and the second turbo charger 72 vary depending on the flow rate of the exhaust gas passing through the turbine 70b and the turbine 72b. In the above engine control system, when it is detected that the intake manifold pressure PM (the boost pressure) sensed by the turbo pressure sensor 42 exceeds the reference pressure value, the ECU 10 controls the above valves so that the waist gate valve 124 is turned ON in order to avoid a further increase of the boost pressure. Accordingly, it is possible for the above engine control system to efficiently control the pressure charging of the intake air of the engine 12 when the engine 12 is operated in various operating conditions.

In the above engine control system, the intake manifold pressure PM indicated by the signal output by the turbo pressure sensor 42 is the base on which the controlling operation of each of the first turbo charger 70 and the second turbo charger 72 is performed by the ECU 10 to control the flow of the exhaust gas in the exhaust pipe 104, as well as the base on which the controlling operation of the VSV 62 is performed by the ECU 10 to control the flow of the evaporated fuel in the purge passage 64. Further, since the above engine control system is provided with an EGR (exhaust gas recirculation) control device, the intake manifold pressure PM indicated by the signal output by the turbo pressure sensor 42 is the base on which an EGR control value used to the exhaust emission control operation of the engine 12 is determined.

As described above, when the signal output by the turbo pressure sensor 42 contains a significant error, an improper EGR control value is determined at a result of the performance of the EGR control procedure based on the measured intake pressure value. If the improper EGR control value is used to the exhaust emission control operation of the engine, the exhaust emission control operation has a difficulty to maintain the driveability of the vehicle at an appropriate level.

In the above engine control system, it is detected whether the turbo pressure sensor 42 is normally operating with no malfunction, that is, whether the signal output by the turbo pressure sensor 42 is correct. When it is detected that the turbo pressure sensor 42 is normally operating, the signal output by the turbo pressure sensor 42 is used to perform the engine control procedures in order to control various control operations of the engine 12.

Next, a description will be given of a malfunction detection routine performed by the ECU 10 for detecting a malfunction in the turbo pressure sensor 42 will be explained.

Figure 2:
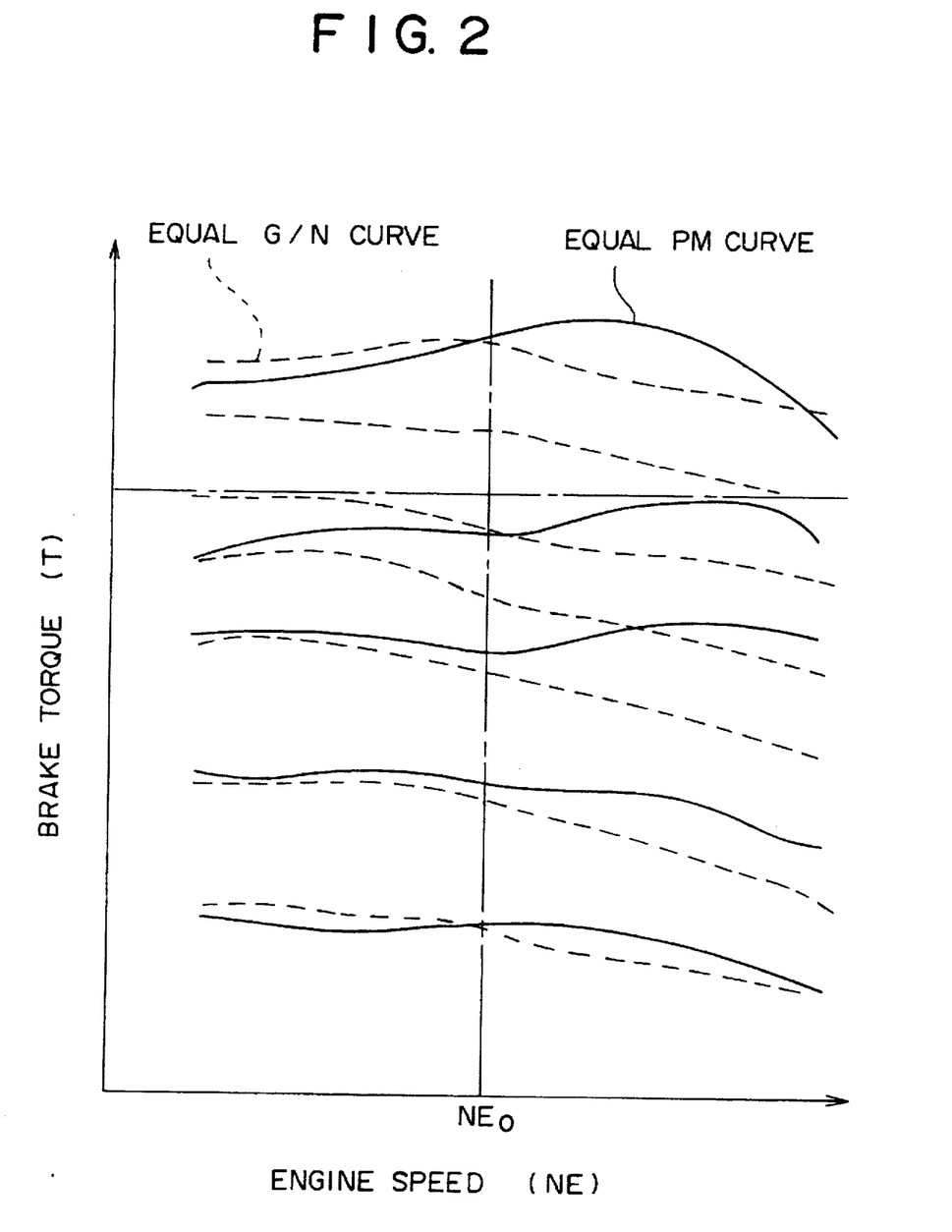
FIG. 2 is a diagram of an equal intake manifold pressure curve and an equal intake-air specific flow rate curve.

FIG. 2 shows an equal intake manifold pressure (PM) curve and an equal intake-air specific flow rate (G/N) curve.

In FIG. 2, a plurality of equal intake manifold pressure (PM) curves which respectively represent different intake manifold pressure values of the engine 12 are indicated by solid lines, and a plurality of equal intake-air specific flow rate (G/N) curves which respectively represent different specific flow rates of the engine 12 are indicated by dotted lines. A reference speed of the engine 12 (which will be described later) is indicated by "NEo", and, in the present embodiment, the reference speed NEo is about 3600 r.p.m. (revolutions per minute).

Each of the equal PM curves indicates changes in brake torque (T) of the engine 12 when the engine speed (NE) is varied while the intake manifold pressure (PM) sensed by the turbo pressure sensor 42 is maintained at a constant value. Each of the equal G/N curves indicates changes in the brake torque (T) when the engine speed (NE) is varied while the intake-air specific flow rate (G/N) is maintained at a constant value. The intake-air specific flow rate G/N is equal to the intake-air mass flow rate G (sensed by the air flow meter 78) divided by the engine speed NE (sensed by the crank position sensor 26).

As shown in FIG. 2, the equal PM curves and the equal G/N curves show that the brake torque (T) on each equal PM curve and the brake torque (T) on each G/N curve do not greatly change in response to the changes in the engine speed (NE). In other words, the brake torque (T) of the engine 12 can be represented by the intake manifold pressure (PM) regardless of the changes in the engine speed (NE), and similarly, the brake torque (T) can be represented by the intake-air specific flow rate (G/N) regardless of the changes in the engine speed (NE). Therefore, it is readily understood that the intake manifold pressure (PM) and the intake-air specific flow rate (G/N) are both representative of the brake torque (T) of the engine 12, and there is a correlation between the intake manifold pressure (PM) and the intake-air specific flow rate (G/N).

Accordingly, if an intake-air specific flow rate (G/N) is determined, an estimated value of the intake manifold pressure (PM) with a reasonable level of accuracy can be determined from the intake-air specific flow rate (G/N) based on the correlation between the PM and the G/N. Further, if the estimated value of the intake manifold pressure (PM) is determined, it can be detected whether a measured value of the intake manifold pressure (PM) from the turbo pressure sensor 42 indicates a correct intake pressure value of the engine 12, by comparing the measured value of the intake manifold pressure (PM) with the estimated value thereof.

Figure 3:
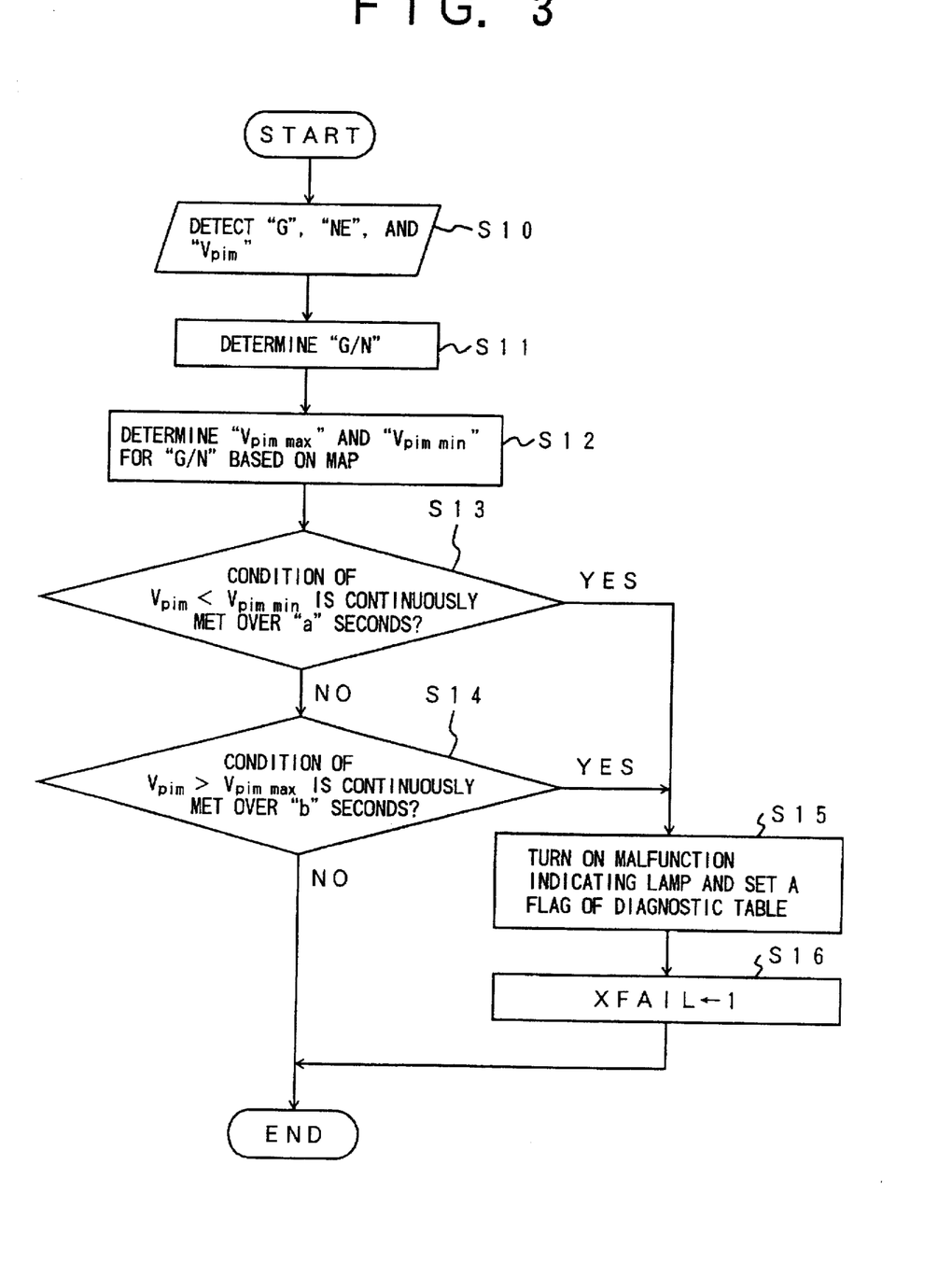
FIG. 3 is a flowchart for explaining a malfunction detection routine in a first embodiment of the present invention.

FIG. 3 shows a malfunction detection routine in a first embodiment of the present invention, which is executed by the ECU 10 in the engine control system in FIG. 1. As a result of the execution of the malfunction detection routine in FIG. 3, it is determined whether a malfunction in the turbo pressure sensor 42 has occurred. That is, it is determined whether the measured value of the intake manifold pressure (PM) from the turbo pressure sensor 42 indicates a correct intake pressure value of the engine 12.

The execution of the malfunction detection routine in FIG. 3 is started at given time intervals after the engine operation is started.

When the malfunction detection routine is started, the ECU 10 at step S10 detects an intake-air flow rate (G) in accordance with the signal output by the air flow meter 78, detects an engine speed (NE) in accordance with the signal output by the crank position sensor 26, and detects the signal output by the turbo pressure sensor 42. This output signal of the turbo pressure sensor 42 indicates a measured value (Vpim) of the intake manifold pressure of the engine 12 at the present cycle.

After the step S10 is performed, step S11 determines an intake-air specific flow rate (G/N) by dividing the intake-air flow rate G by the engine speed NE.

Figure 4:
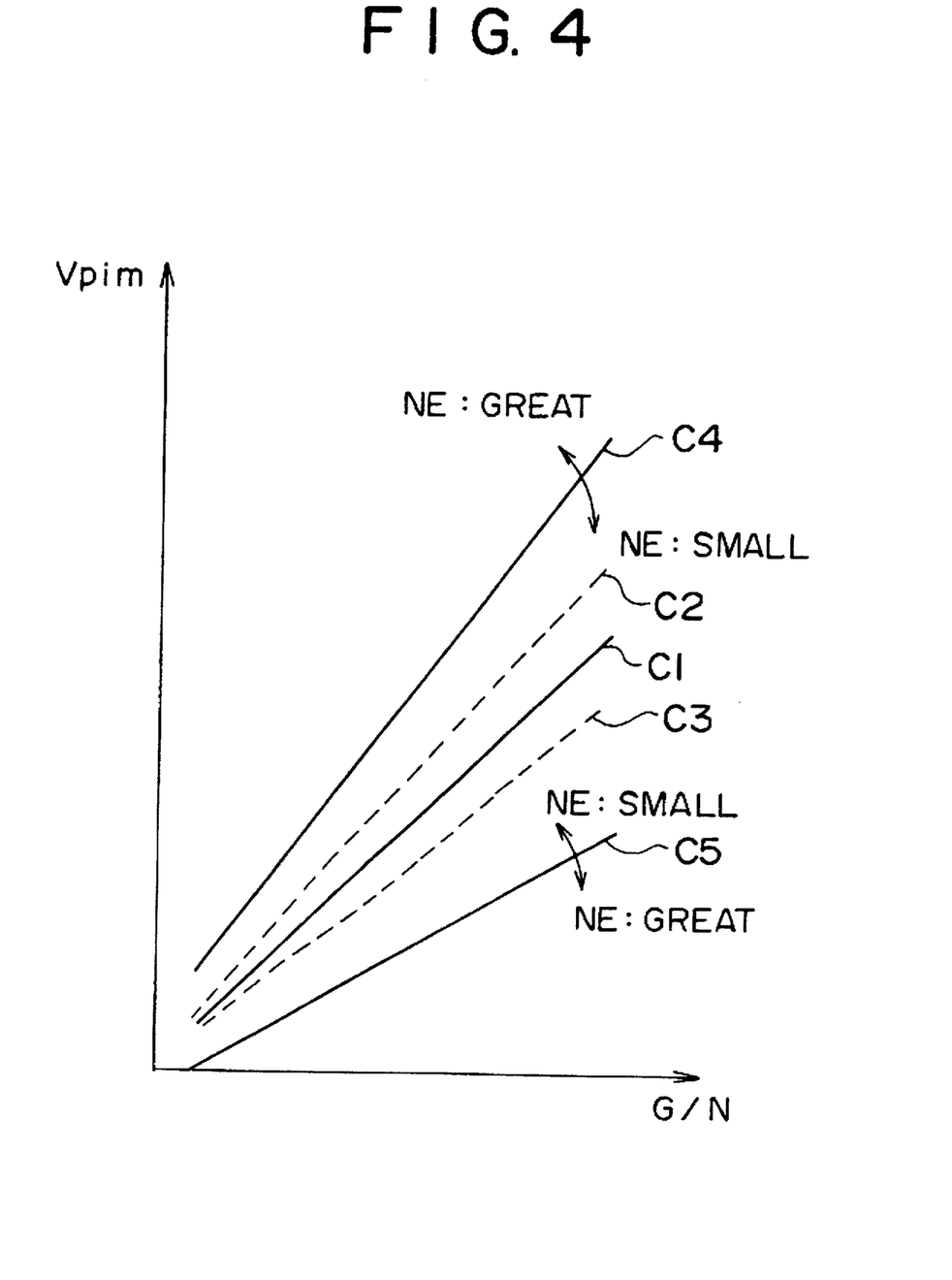
FIG. 4 is a diagram of a map used when the malfunction detection routine in FIG. 3 is performed.

After the step S11 is performed, step S12 determines an allowable range of the intake pressure of the engine 12 for the intake-air specific flow rate G/N based on a map shown in FIG. 4. The map shown in FIG. 4 is stored in a memory of the ECU 10 in the engine control system in FIG. 1. The allowable range of the intake pressure is determined by obtaining an upper limit value (Vpimmax) of the intake pressure for the G/N value and a lower limit value (Vpimmin) of the intake pressure for the G/N value.

In FIG. 4, a reference G/N-Vpim characteristic of the turbo pressure sensor 42 is indicated by a solid line C1. This characteristic C1 is obtained when the output signal of the turbo pressure sensor 42 shows a reference characteristic in response to changes in the intake-air specific flow rate G/N. An upper limit G/N-Vpim characteristic of the turbo pressure sensor 42 and a lower limit characteristic thereof are indicated by a dotted line C2 and a dotted line C3, respectively. When the output signal Vpim of the turbo pressure sensor 42 varies within an allowable range in response to changes in the intake-air specific flow rate G/N, a point at the coordinates (G/N, Vpim) is plotted in the area between the upper limit characteristic C2 and the lower limit characteristic C3.

Further, in FIG. 4, an upper out-of-range discrimination boundary and a lower out-of-range discrimination boundary are indicated by a solid line C4 and a solid line C5, respectively. When the turbo pressure sensor 42 is normally operating with no malfunction, it is impossible that a point at the coordinates (G/N, Vpim) for the output signal of the turbo pressure sensor 42 is plotted outside the area between the upper out-of-range discrimination boundary C4 and the lower out-of-range discrimination boundary C5. Therefore, if the point is plotted beyond the boundary, it is determined that a malfunction in the turbo pressure sensor 42 has occurred.

In the present embodiment, if the output signal of the turbo pressure sensor 42 corresponds to either a position above the upper boundary C4 in FIG. 4 or a position below the lower boundary C5 in FIG. 4, it is determined that a malfunction in the turbo pressure sensor 42 has occurred. That is, it is determined that the output signal of the turbo pressure sensor 42 does not indicate a correct intake pressure value of the engine 12.

At the above step S12, the upper limit value Vpimmax of the intake pressure for the intake-air specific flow rate G/N is determined in accordance with the upper out-of-range discrimination boundary C4 in FIG. 4, and the lower limit value Vpimmin of the intake pressure for the intake-air specific flow rate G/N is determined in accordance with the lower out-of-range discrimination boundary C5 in FIG. 4.

After the step S12 is performed, step S13 detects whether a condition in which the measured value Vpim of the intake pressure is below the lower limit value Vpimmin (Vpim<Vpimmin) is continuously met over a reference time (="a" seconds).

If the result at the step S12 is negative, step S14 is performed. Step S14 detects whether a condition in which the measured value Vpim of the intake pressure is above the upper limit value Vpimmax (Vpim>Vpimmax) is continuously met over a reference time (="b" seconds).

If the result at the step S14 is negative, it is determined that the turbo pressure sensor 42 is normally operating with no malfunction. The malfunction detection routine in FIG. 3 ends, and no further action is taken at the present cycle.

If either the result at the step S13 or the result at the step S14 is affirmative, it is determined that a malfunction in the turbo pressure sensor 42 has occurred. In this case, step S15 turns ON a malfunction indicating lamp (MIL), and sets a flag of a diagnostic table as indicating the occurrence of the malfunction. The ON state of the lamp MIL notifies the vehicle operator of the malfunction in the turbo pressure sensor 42.

After the step S15 is performed, step S16 sets a failure flag XFAIL at one "1". The failure flag XFAIL which is set at one indicates the malfunction in the turbo pressure sensor 42. After the step S16 is performed, the malfunction detection routine in FIG. 3 ends.

When the failure flag XFAIL is equal to 1, the ECU 10 determines an estimated value of the intake pressure for the intake-air specific flow rate (G/N) based on the reference G/N-Vpim characteristic (C1) in FIG. 4. This estimated value is representative of the intake pressure of the engine 12 for the G/N value in accordance with the reference characteristic. The ECU 10 performs the engine control procedures to control the first and second turbo chargers 70 and 72 as well as the VSV 62, based on the estimated value of the intake pressure. Accordingly, it is possible for the engine control system in FIG. 1 to always control the first and second turbo chargers 70 and 72 as well as the VSV 62 in appropriate ways, regardless of whether the output signal of the turbo pressure sensor 42 indicates a correct intake pressure value of the engine 12.

Generally speaking, as shown in FIG. 2, the degree of the closeness of the correlation between the intake-air specific flow rate G/N and the intake manifold pressure PM of the engine to the linear correlation indicated by the reference characteristic C1 in FIG. 4, becomes high when the brake torque T of the engine is small. In other words, the degree of the closeness of the correlation between the G/N and the PM becomes high when the intake-air specific flow rate G/N is small or when the intake manifold pressure PM is small.

The above tendency of the G/N-PM correlation is recognized as follows. When the brake torque T of the engine is small, the flow of the intake air from the surge tank 40 to the engine 12 through the intake pipe 45 is moderate. The correlation between the G/N and the PM in this case is not greatly influenced by the flow of the intake air in the intake passage. On the other hand, when the brake torque T of the engine is high, the flow of the intake air from the surge tank 40 to the engine 12 through the intake pipe 45 is hasty. The correlation between the G/N and the PM in this case is greatly influenced by the flow of the intake air in the intake passage.

It is understood that, when the turbo pressure sensor 42 is normally operating with no malfunction, the correlation between the G/N and the PM approaches the reference characteristic C1 in FIG. 4 as the degree of the closeness of the correlation becomes high. Thus, it can be supposed that the degree of the closeness of the G/N-PM correlation is high when the brake torque T of the engine is small while the degree of the closeness of the G/N-PM correlation is low when the brake torque T of the engine is great.

Accordingly, when the intake-air specific flow rate G/N is small, corresponding points at the coordinates (G/N, Vpim)

for the output signal of the turbo pressure sensor 42 which is normally operating with no malfunction are gathered in a narrow area in the vicinity of the reference characteristic C1 in FIG. 4. On the other hand, when the intake-air specific flow rate G/N is great, the corresponding points at the coordinates (G/N, Vpim) are scattered to a relatively wide range of areas centered on the reference characteristic C1 in FIG. 4.

As shown in FIG. 4, the map used in the malfunction detection routine of the present embodiment is defined in such a manner that the allowable range of the intake pressure becomes wide as the G/N is great while it becomes narrow as the G/N is small. By using the above map, it is possible to accurately detect a malfunction in the turbo pressure sensor 42 regardless of whether the intake-air specific flow rate G/N is great or small.

Strictly speaking, the degree of the closeness of the correlation between the intake-air specific flow rate G/N and the intake manifold pressure PM of the engine to the linear correlation indicated by the reference characteristic C1 in FIG. 4, is influenced by not only the brake torque T of the engine but also the engine speed NE. The degree of the closeness of the correlation between the G/N and the PM becomes high as the engine speed NE is small.

The above tendency of the G/N-PM correlation is recognized as follows. As shown in FIG. 2, when the engine speed NE is low, the mass flow rate of the intake air from the surge tank 40 to the engine 12 through the intake pipe 45 is small. The correlation between the G/N and the PM in this case is not greatly influenced by the flow of the intake air in the intake passage. On the other hand, when the engine speed NE is high, the mass flow rate of the intake air from the surge tank 40 to the engine 12 through the intake pipe 45 is great. The correlation between the G/N and the PM in this case is greatly influenced by the flow of the intake air in the intake passage.

Accordingly, the degree of the closeness of the G/N-PM correlation is high when the engine speed NE is small while the degree of the closeness of the G/N-PM correlation is low when the engine speed NE is great. In other words, when the engine speed NE is low, the corresponding points at the coordinates (G/N, Vpim) for the output signal of the turbo pressure sensor 42 which is normally operating with no malfunction are gathered in a narrow area in the vicinity of the reference characteristic C1 in FIG. 4. When the engine speed NE is high, the corresponding points at the coordinates (G/N, Vpim) are scattered to a relatively wide range of areas centered on the reference characteristic C1 in FIG. 4.

In the malfunction detection routine of the present embodiment, the allowable range of the intake pressure is determined based on the upper and lower out-of-range discrimination boundaries C4 and C5 in FIG. 4. If the boundaries C4 and C5 of the map shown in FIG. 4 are defined such that the boundaries C4 and C5 approach the reference characteristic C1 as the engine speed NE is small, and the boundaries C4 and C5 are distant from the reference characteristic C1 as the engine speed NE is great, the thus defined map is useful to accurately detect a malfunction in the turbo pressure sensor 42 regardless of the engine speed NE is great or small.

Figure 5:
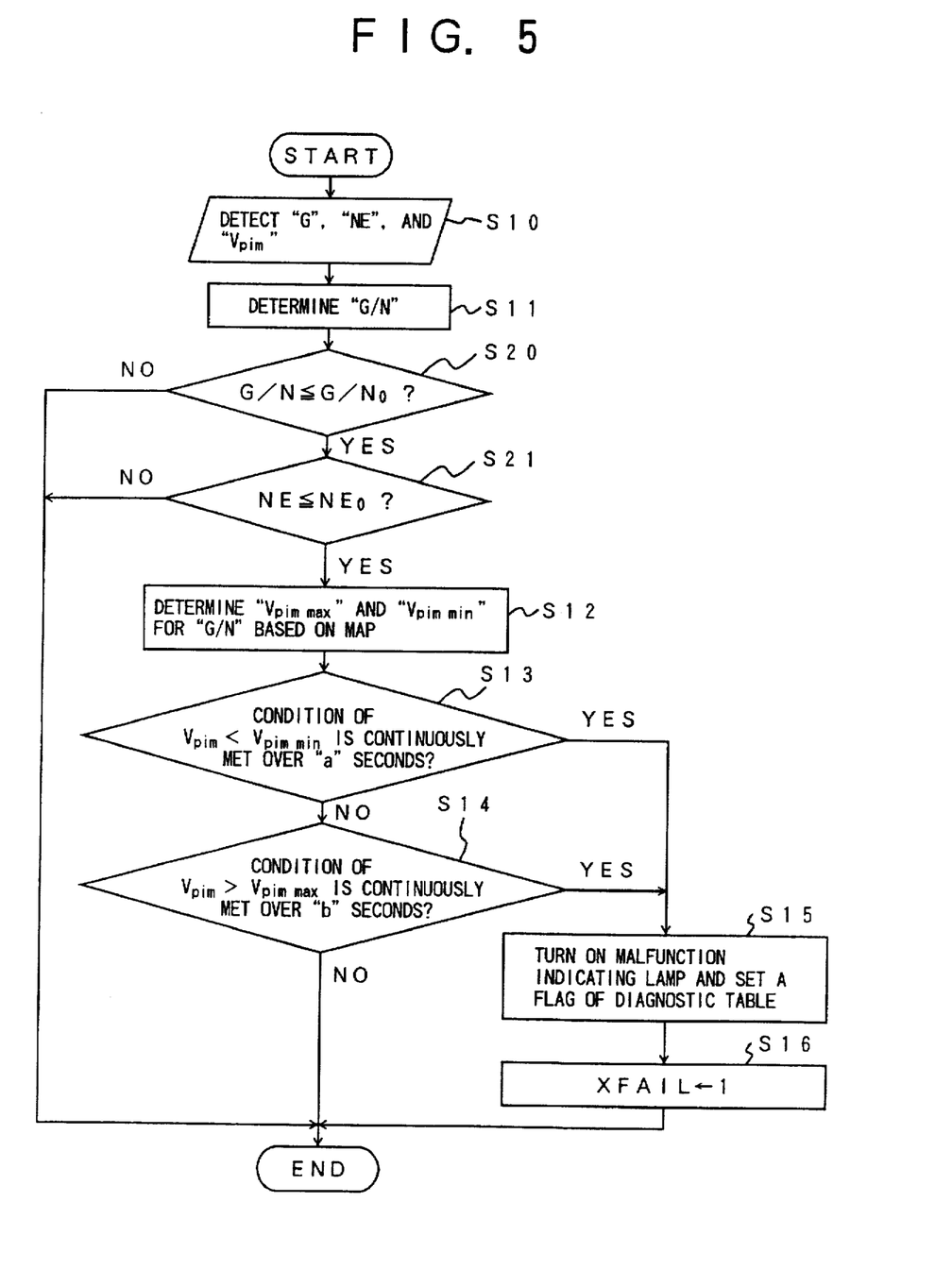
FIG. 5 is a flowchart for explaining a malfunction detection routine in a second embodiment of the present invention.

FIG. 5 shows a malfunction detection routine in a second embodiment of the present invention.

Similarly to the above-described first embodiment, the malfunction detection routine in FIG. 5 is executed by the ECU 10 in the engine control system in FIG. 1. As a result of the execution of the malfunction detection routine in FIG. 5, it is more accurately determined whether a malfunction in the turbo pressure sensor 42 has occurred.

The execution of the malfunction detection routine in FIG. 5 is started at given time intervals after the engine operation is started. In FIG. 5, the steps which are the same as corresponding steps in FIG. 3 are designated by the same reference numerals, and a description thereof will be omitted.

In the malfunction detection routine in FIG. 5, when the step S11 is performed, the intake-air specific flow rate G/N is determined from the intake-air flow rate G and the engine speed NE.

After the step S11 is performed, the ECU 10 at step S20 detects whether the intake-air specific flow rate G/N is below a threshold value G/No (G/N≦G/No).

As described above, the correlation between the G/N and the PM becomes close to the linear correlation as the intake-air specific flow rate G/N is small. Therefore, when the result at the step S20 is affirmative (G/N≦G/No), it is determined that the degree of the closeness of the G/N-PM correlation is high. In this case, step S21 is performed.

When the result at the step S20 is negative (G/N>G/No), it is determined that the degree of the closeness of the G/N-PM correlation is low. In order to accurately detect a malfunction in the turbo pressure sensor 42, the malfunction determination in this case should not be performed. For this reason, when the result at the step S20 is negative, the malfunction detection routine in FIG. 5 ends, and no further action is taken at the present cycle.

Step S21 detects whether the engine speed NE is below the reference speed NEo (NE≦NEo).

As described above, the correlation between the G/N and the PM becomes close to the linear correlation as the engine speed NE is small. Therefore, when the result at the step S21 is affirmative (NE≦NEo), it is determined that the degree of the closeness of the G/N-PM correlation is high. In this case, the subsequent steps S12–S16 are performed in order to accurately detect a malfunction in the turbo pressure sensor 42.

When the result at the step S21 is negative (NE>NEo), it is determined that the degree of the closeness of the G/N-PM correlation is low. In order to accurately detect a malfunction in the turbo pressure sensor 42, the malfunction determination in this case should not be performed. For this reason, when the result at the step S21 is negative, the malfunction detection routine in FIG. 5 ends, and no further action is taken at the present cycle.

In the present embodiment, the malfunction determination concerning the signal (Vpim) output by the turbo pressure sensor 42 is performed only when the degree of the closeness of the G/N-PM correlation to the reference characteristic is detected as being high. Therefore, it is possible for the malfunction detecting apparatus of the present embodiment to more accurately detect a malfunction in the turbo pressure sensor 42.

The intake pressure sensor malfunction detecting apparatus in the above-described embodiments of the present invention can detect, with a reasonable level of accuracy, a malfunction in the turbo pressure sensor 42 of the engine 12. In addition, by using the malfunction detecting apparatus of the present invention, it is possible to reliably prevent the emission performance of the engine 12 from being lowered due to the out-of-range signal from the turbo pressure sensor 42. Further, it is possible for the malfunction detecting apparatus of the present invention to provide an accurate malfunction determination of the turbo pressure sensor 42 to the engine control system with a remarkably low cost so that an appropriate control over the engine control procedures is always provided.

Further, the present invention is not limited to the above-described embodiments, and variations and modifications may be made without departing from the scope of the present invention.

What is claimed is:

1. An apparatus for detecting a malfunction in an intake pressure sensor of an engine, comprising:

first detecting means for detecting a flow rate of intake air of the engine;

second detecting means for detecting a speed of the engine;

intake pressure estimating means for determining an intake-air specific flow rate from said intake-air flow rate and said engine speed, said intake-air specific flow rate indicating a calculated value of a mass flow rate of intake air per one revolution of the engine, and for determining an estimated value of intake manifold pressure from said calculated value based upon a stored correlation between the intake-air specific flow rate and the intake manifold pressure; and malfunction determining means for detecting whether a malfunction in the intake pressure sensor has occurred by comparing a measured value of the intake manifold pressure output by the intake pressure sensor with said estimated value.

2. The apparatus according to claim 1, wherein said malfunction determining means detects whether a condition in which a measured intake pressure value indicated by the signal output by the intake pressure sensor is below a lower limit value of the intake pressure of the engine is continuously met over a reference time.

3. The apparatus according to claim 1, wherein said malfunction determining means detects whether a condition in which a measured intake pressure value indicated by the signal output by the intake pressure sensor is above an upper limit value of the intake pressure of the engine is continuously met over a reference time.

4. The apparatus according to claim 1, wherein said malfunction determining means sets a failure flag at one when it is determined that the malfunction in the intake pressure sensor has occurred.

5. The apparatus according to claim 1, further comprising:

first determining means for detecting whether said intake-air specific flow rate from said intake pressure estimating means is below a threshold value before said detection of the malfunction in the intake pressure sensor is performed by said malfunction determining means.

6. The apparatus according to claim 5, wherein said malfunction detection by said malfunction determining means is inhibited when it is detected by said first determining means that said intake-air specific flow rate is not below the threshold value.

7. The apparatus according to claim 1, further comprising:

second determining means for detecting whether said engine speed is below a reference speed before said detection of the malfunction in the intake pressure sensor is performed by said malfunction determining means.

8. The apparatus according to claim 7, wherein said malfunction detection by said malfunction determining means is inhibited when it is detected by said second determining means that said engine speed is not below the reference speed.

9. A method of detecting a malfunction in an intake pressure sensor of an engine, comprising the steps of:

detecting a specific flow rate of intake air of the engine;

detecting a of the engine;

determining an intake-air specific flow rate from said intake-air flow rate and said engine speed, said intake-air specific flow rate indicating a calculated value of a mass flow rate of intake air per one revolution of the engine;

determining an estimated value of intake manifold pressure from said calculated value based on a stored correlation between the intake-air specific flow rate and the intake manifold pressure; and making a determination as to whether a malfunction in the intake pressure sensor has occurred by comparing a measured value of intake manifold pressure output from the intake pressure sensor with said estimated value.

10. The method according to claim 9, wherein said step of detecting whether the malfunction in the intake pressure sensor has occurred includes detecting whether a condition in which a measured intake pressure value indicated by the signal output by the intake pressure sensor is below a lower limit value of the intake pressure of the engine is continuously met over a reference time.

11. The method according to claim 9, wherein said step of detecting whether the malfunction in the intake pressure sensor has occurred includes detecting whether a condition in which a measured intake pressure value indicated by the signal output by the intake pressure sensor is above an upper limit value of the intake pressure of the engine is continuously met over a reference time.

12. The method according to claim 9, further comprising a step of:

setting a failure flag at one when it is determined that the malfunction in the intake pressure sensor has occurred.

13. The method according to claim 9, wherein said step of detecting whether the malfunction in the intake pressure sensor has occurred is inhibited when it is detected that said intake-air specific flow rate is not below a threshold value.

14. The method according to claim 9, wherein said step of detecting whether the malfunction in the intake pressure sensor has occurred is inhibited when it is detected that said engine speed is not below a reference speed.

* * * * *

UNITED STATES PATENT AND TRADEMARK OFFICE
CERTIFICATE OF CORRECTION

PATENT NO.  : 5,698,780
DATED       : December 16, 1997
INVENTOR(S) : Koichi MIZUTANI, et al.

It is certified that error appears in the above-indentified patent and that said Letters Patent is hereby corrected as shown below:

Column 1, line 37, delete "a".

Column 8, line 13, change "waste gate" at end of line to --waist gate--.

Column 8, line 60, change "124" to --122--.

Column 9, line 5, change "124" to --122--.

Column 9, line 10, change "heady-load" to --heavy-load--.

Column 9, line 26, change "124" to --122--.

Column 9, line 45, change "to" to --in--.

Column 9, line 52, change "to" to --in--.

Column 9, line 64, delete "a description will be given of".

Column 13, line 60, after "of" delete --whether--.

UNITED STATES PATENT AND TRADEMARK OFFICE
CERTIFICATE OF CORRECTION

PATENT NO. : 5,698,780
DATED : December 16, 1997
INVENTOR(S) : Koichi MIZUTANI, et al.

It is certified that error appears in the above-indentified patent and that said Letters Patent is hereby corrected as shown below:

Column 16, line 14, after "a" insert --speed--.

Signed and Sealed this

First Day of September, 1998

Attest:

BRUCE LEHMAN

Attesting Officer

Commissioner of Patents and Trademarks